United States Patent
Lee et al.

(10) Patent No.: US 11,269,178 B2
(45) Date of Patent: Mar. 8, 2022

(54) POLYGON MIRROR ASSEMBLY AND SCAN DEVICE

(71) Applicant: ELECTRONICS AND TELECOMMUNICATIONS RESEARCH INSTITUTE, Daejeon (KR)

(72) Inventors: Eui Su Lee, Sejong-si (KR); Kyung Hyun Park, Daejeon (KR); Il Min Lee, Daejeon (KR); Kiwon Moon, Daejeon (KR); Dong Woo Park, Sejong-si (KR); Hyun Soo Kim, Daegu (KR); Ho Jin Lee, Daejeon (KR); Jeong Woo Park, Daejeon (KR); Jun Hwan Shin, Daejeon (KR); Kyeong Sun Choi, Sejong-si (KR); Dahye Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 196 days.

(21) Appl. No.: 16/668,574

(22) Filed: Oct. 30, 2019

(65) Prior Publication Data

US 2020/0150420 A1    May 14, 2020

(30) Foreign Application Priority Data

Nov. 14, 2018 (KR) .................. 10-2018-0139740
Sep. 16, 2019 (KR) .................. 10-2019-0113723

(51) Int. Cl.
*G02B 26/08* (2006.01)
*G02B 26/12* (2006.01)
*G02B 26/10* (2006.01)

(52) U.S. Cl.
CPC ....... *G02B 26/122* (2013.01); *G02B 26/0816* (2013.01); *G02B 26/101* (2013.01)

(58) Field of Classification Search
CPC . G02B 26/122; G02B 26/0816; G02B 26/101
(Continued)

(56) References Cited

U.S. PATENT DOCUMENTS

| 5,864,391 A | 1/1999 | Hosokawa et al. |
| 6,515,767 B1 | 2/2003 | Sakurai |

(Continued)

FOREIGN PATENT DOCUMENTS

| JP | 9274076 A | 10/1997 |
| KR | 20000026440 A | 5/2000 |

(Continued)

OTHER PUBLICATIONS

Eui Su Lee et al., "Semiconductor-Based Terahertz Photonics for Industrial Applications", Photonics West 2019 Conference 10917-12, Session 3, The Moscone Center, San Francisco, USA, Feb. 2-7, 2019.

*Primary Examiner* — Euncha P Cherry
(74) *Attorney, Agent, or Firm* — Rabin & Berdo, P.C.

(57) ABSTRACT

Provided are a polygon mirror assembly and a scan device. A polygon mirror assembly includes: a polygon mirror including a plurality of reflection surfaces spaced apart from a rotation axis by a predetermined distance; a first motor for rotating the polygon mirror around the rotation axis; a second motor for moving the polygon mirror in a first axial direction such that the rotation axis is tilted while the first motor rotates the polygon mirror; and a clock signal extraction surface for extracting a clock signal for detecting a change in a rotational speed of the first motor.

20 Claims, 12 Drawing Sheets

(58) Field of Classification Search
USPC .................................................. 359/266.1
See application file for complete search history.

(56) References Cited

U.S. PATENT DOCUMENTS

| | | |
|---|---|---|
| 2006/0139718 A1 | 6/2006 | Ishihara |
| 2010/0091107 A1 | 4/2010 | Shin et al. |
| 2010/0128937 A1 | 5/2010 | Yoo et al. |
| 2011/0127241 A1* | 6/2011 | Rumsby ............. B23K 26/0626 219/121.62 |
| 2012/0154207 A1 | 6/2012 | Kim et al. |

FOREIGN PATENT DOCUMENTS

| | | |
|---|---|---|
| KR | 100332860 B1 | 11/2002 |
| KR | 10-2010-0040525 A | 4/2010 |
| KR | 10-2016-0002137 A | 1/2016 |

\* cited by examiner

POLYGON MIRROR ASSEMBLY AND SCAN DEVICE

CROSS-REFERENCE TO RELATED APPLICATION

This application claims priority under 35 U.S.C. § 119 to Korean Patent Application No. 10-2018-0139740, filed Nov. 14, 2018, and Korean Patent Application No. 10-2019-0113723, filed Sep. 16, 2019, in the Korean Intellectual Property Office, the disclosures of which are incorporated herein by reference in their entirety.

BACKGROUND

(a) Technical Field

The present disclosure relates to a polygon mirror assembly and a scan device.

(b) Description of the Related Art

Non-ionized electromagnetic waves, such as millimeter waves or terra waves, are harmless to living bodies, and are useful for non-destructive detection inside objects related to living bodies where safety is required. There may be various methods for scanning a specimen to obtain a two-dimensional scan image (for example, a two-dimensional non-destructive detection image), for example, using a two-dimensional array light source or using a single light source.

In order to increase signal-to-noise ratio (s/n ratio) and resolution, a motor that can change direction quickly against high inertia is required, and the diameter of an incident beam needs to be large. As a result, the volume of the scan device may be increased, thereby decreasing mobility and increasing spatial constraints.

The above information disclosed in this section is merely for enhancement of understanding of the general background of the disclosure and therefore it may contain information that does not form the prior art that is already known to a person skilled in the art.

SUMMARY

Aspects of the present disclosure provide a polygon mirror assembly capable of obtaining a two-dimensional scan image using a compact and simple structure.

Aspects of the present disclosure provide a scan device capable of obtaining a two-dimensional scan image using a compact and simple structure.

The aspects of the present disclosure are not restricted to those mentioned above, and another aspect which is not mentioned will be clearly understood by a person skilled in the art from the description below.

According to an aspect of the present disclosure, there is provided a polygon mirror assembly including: a polygon mirror including a plurality of reflection surfaces spaced apart from a rotation axis by a predetermined distance; a first motor for rotating the polygon mirror around the rotation axis; a second motor for moving the polygon mirror in a first axial direction such that the rotation axis is tilted while the first motor rotates the polygon mirror; and a clock signal extraction surface for extracting a clock signal for detecting a change in a rotational speed of the first motor.

The second motor may repeatedly move the polygon mirror such that the rotation axis is tilted only within a predetermined angle range.

A shaft of the first motor may be disposed on the rotation axis of the polygon mirror.

The second motor may be coupled to the polygon mirror via an intermediate connection, and one end of the intermediate connection may be coupled to the first motor, while the other end of the intermediate connection may be coupled to a shaft of the second motor.

The rotational speed of the first motor may be faster than a rotational speed of the second motor.

The clock signal extraction surface may reflect electromagnetic waves incident from a light source at an angle at which the polygon mirror does not scan a specimen.

The clock signal extraction surface may be disposed inside the polygon mirror, and may reflect electromagnetic waves generated from a light source and incident on the polygon mirror.

The clock signal extraction surface may be disposed outside the polygon mirror, and may reflect electromagnetic waves incident after reflection on the polygon mirror.

The polygon mirror may include acrylonitrile butadiene styrene copolymer (ABS) resin, and the plurality of reflection surfaces may be chrome plated.

According to another aspect of the present disclosure, there is provided a polygon mirror assembly including: a polygon mirror including a plurality of reflection surfaces spaced apart from a rotation axis by a predetermined distance; a first motor rotating the polygon mirror around the rotation axis; a second motor for moving the polygon mirror in a first axial direction such that the rotation axis is tilted; and an intermediate connection at which one end is coupled to the first motor and the other end is coupled to a shaft of the second motor.

A shaft of the first motor may be disposed on the rotation axis of the polygon mirror.

The second motor may repeatedly move the polygon mirror such that the rotation axis is tilted only within a predetermined angle range.

The polygon mirror may include a clock signal extraction surface that reflects electromagnetic waves incident on the polygon mirror at an angle at which the polygon mirror does not scan a specimen.

The first motor may be a brushless direct current (BLDC) motor, and the second motor may be a stepping motor.

According to another aspect of the present disclosure, there is provided a scan device including: a light source for generating electromagnetic waves including millimeter waves or terra waves; a collimating lens for forming the electromagnetic waves generated from the light source in parallel; a polygon mirror assembly including a polygon mirror, the polygon mirror assembly moving the polygon mirror in a first axial direction such that a rotation axis is tilted using a second motor, while rotating the polygon mirror around the rotation axis using a first motor; a detector for detecting electromagnetic waves reflected from the polygon mirror and obtaining a two-dimensional image of a specimen; and a clock signal extraction surface for extracting a clock signal for detecting a change in a rotational speed of the first motor.

The second motor may repeatedly move the polygon mirror such that the rotation axis is tilted only within a predetermined angle range.

The clock signal extraction surface may reflect electromagnetic waves incident from a light source at an angle at which the polygon mirror does not scan the specimen.

The clock signal extraction surface may be disposed inside the polygon mirror, and may reflect electromagnetic waves generated from the light source and incident on the polygon mirror.

The clock signal extraction surface may be disposed outside the polygon mirror, and may reflect electromagnetic waves incident after reflection on the polygon mirror.

The two-dimensional image of the specimen may include a plurality of rows, each of the plurality of rows including an image signal for the specimen and the clock signal, and the detector may correct distortion of the two-dimensional image due to the change in the rotational speed of the first motor by aligning the plurality of rows based on the clock signal.

According to the present disclosure, it is possible to provide a polygon mirror assembly manufactured to have a simple structure and being capable of obtaining a two-dimensional scan image at high speed, and a scan device using the same.

Accordingly, a polygon mirror assembly and a scan device can be miniaturized, and thus the mobility of the polygon mirror assembly and the scan device can be increased, while the spatial constraints can be reduced, thereby the usability in the field where non-destructive detection is performed can be increased. Furthermore, it is possible to manufacture the polygon mirror assembly and the scan device at low cost.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
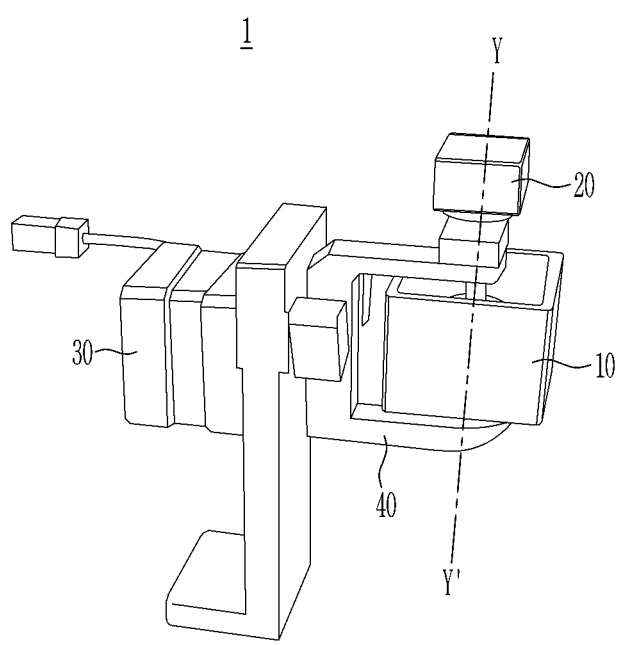
FIG. 1 illustrates a polygon mirror assembly according to an embodiment of the present disclosure.

Hereinafter, exemplary embodiments of the present disclosure will be described in detail with reference to the accompanying drawings so that those skilled in the art may easily implement the present disclosure. As those skilled in the art would realize, the described embodiments may be modified in various different ways, all without departing from the spirit or scope of the present disclosure. In the drawings, parts irrelevant to the description are omitted in order to clearly describe the present disclosure, and like reference numerals designate like parts throughout the specification.

Throughout the specification and claims, when a portion is said to "include" a certain component, it means that it can further include other components, except to exclude other components unless specifically stated otherwise.

Now, a polygon mirror assembly and a scan device according to the embodiments of the present disclosure will be described in detail with reference to the drawings.

In various embodiments of the present disclosure, electromagnetic waves may include millimeter waves or tera waves. The millimeter waves are electromagnetic waves in an extremely high frequency region, and may preferably have a frequency in the range of 30 GHz to 300 GHz. Tera waves are electromagnetic waves in a terahertz region, and may preferably have a frequency in the range of 0.1 THz to 10 THz. Even if it is slightly out of these ranges, if it is within a range which can be easily conceived by those skilled in the art, it can be recognized as millimeter waves or terra waves in the present disclosure.

FIG. 1 illustrates a polygon mirror assembly according to an embodiment of the present disclosure.

Referring to FIG. 1, a polygon mirror assembly 1 according to an embodiment of the present disclosure includes a polygon mirror 10, a first motor 20, a second motor 30, and an intermediate connection 40.

The polygon mirror 10 may include a plurality of reflection surfaces, and the plurality of reflection surfaces may reflect electromagnetic waves incident on the polygon mirror 10. The polygon mirror 10 may rotate around a virtual rotation axis Y-Y', and the plurality of reflection surfaces may be spaced apart from the rotation axis by a predetermined distance, for example, to surround the rotation axis. Distances from the plurality of reflection surfaces to the rotation axis Y-Y' may all be arranged to be the same shortest distance, but the scope of the present disclosure is not limited thereto.

In the present embodiment, the number of reflection surfaces of the polygon mirror 10 is shown as four, but the scope of the present disclosure is not limited thereto, and may be any number, such as six or eight. For example, the higher a scan speed that is required to scan more points in one rotation, the greater the number of reflection surfaces the polygon mirror 10 may have. As another example, as the number of reflection surfaces increases, a size of the polygon mirror 10 may increase or distortion in a scan image may increase, and in consideration of this, the polygon mirror 10 may include an appropriate number of reflection surfaces.

In some embodiments of the present disclosure, the polygon mirror 10 may be implemented to have a single structure, instead of an assembly structure, to reflect incident electromagnetic waves into a two-dimensional region. For example, the reflection surfaces of the polygon mirror 10 can be manufactured in a single structure to minimize the distances from a center of rotation to all the reflection surfaces, thereby increasing a diameter of an incident beam for realizing high resolution, and distortion due to tilting which will be described later can be minimized. However, the scope of the present disclosure is not limited thereto.

In some embodiments of the present disclosure, the polygon mirror 10 can be manufactured using an acrylonitrile butadiene styrene copolymer (ABS) resin. Since the polygon mirror 10 may rotate at a high speed (for example, several thousand rpm), it may be dangerous when the polygon mirror 10 is in contact with a human body while the polygon mirror 10 is rotating. By using such a high strength, low density (for example, 1.07 cm3) plastic-based ABS resin instead of metal, it is possible to protect the human body from the polygon mirror 10 which rotates at a high speed. However, the scope of the present disclosure is not limited thereto.

Further, in some embodiments of the present disclosure, chrome plating may be performed on the polygon mirror 10 (for example, a plurality of reflection surfaces of the polygon mirror 10). Accordingly, the total reflection of the electromagnetic waves may occur satisfactorily on surfaces of the polygon mirror 10 made of ABS resin instead of metal. However, the scope of the present disclosure is not limited thereto.

In some embodiments of the present disclosure, the polygon mirror 10 can be manufactured to include an empty space. In order to reduce a weight of the polygon mirror 10, it can be manufactured to include as much empty space as possible except for a plurality of reflection surfaces and a coupling region coupled with the first motor 20. However, the scope of the present disclosure is not limited thereto.

The first motor 20 may rotate the polygon mirror 10 around the rotation axis Y-Y'.

In the present embodiment, the first motor 20 may be coupled to a top or bottom surface of the polygon mirror 10. Specifically, the first motor 20 and the polygon mirror 10 may be coupled such that a shaft of the first motor 20 is disposed on the rotation axis Y-Y' of the polygon mirror 10. That is, the first motor 20 may be coupled to the top or bottom surface of the polygon mirror 10 to rotate the polygon mirror 10 around the rotation axis Y-Y'.

The second motor 30 may move the polygon mirror 10 in a first axial direction such that the rotational axis Y-Y' is tilted. Specifically, the second motor 30 may move the polygon mirror 10 in the first axial direction, for example, move up and down based on FIG. 1 such that the rotation axis Y-Y' is tilted while the first motor 20 rotates the polygon mirror 10.

In the present embodiment, the second motor 30 may be coupled to the polygon mirror 10 via the intermediate connection 40. The intermediate connection 40 may be disposed between the polygon mirror 10 and the second motor 30, and one end of the intermediate connection 40 may be coupled to the polygon mirror 10 and the other end of the intermediate connection 40 may be coupled to the second motor 30.

In particular, one end of the intermediate connection 40 may be coupled to the top or bottom surface of the polygon mirror 10. Alternatively, when the top or bottom surface is not present to secure the empty space in the polygon mirror 10 as shown in FIG. 1, one end of the intermediate connection 40 may be coupled to the first motor 20.

On the other hand, the other end of the intermediate connection 40 may be coupled to a shaft of the second motor 30. That is, the second motor 30 may be coupled to the other end of the intermediate connection 40 to move the polygon mirror 10 in the first axis direction so that the rotation axis Y-Y' is tilted.

FIGS. 2 to 5 illustrate operations of a polygon mirror assembly according to an embodiment of the present disclosure.

Figure 2:
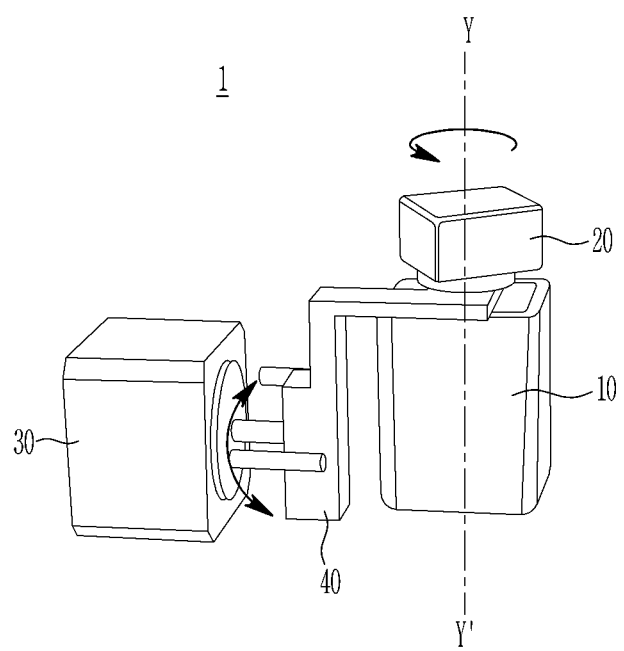
FIGS. 2 to 5 illustrate operations of a polygon mirror assembly according to an embodiment of the present disclosure.
Figure 3:
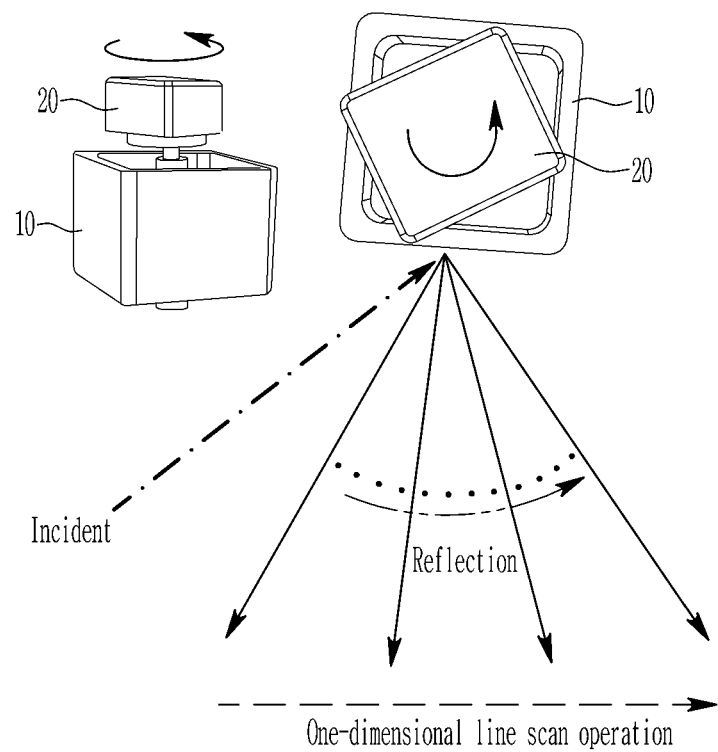
Figure 5:
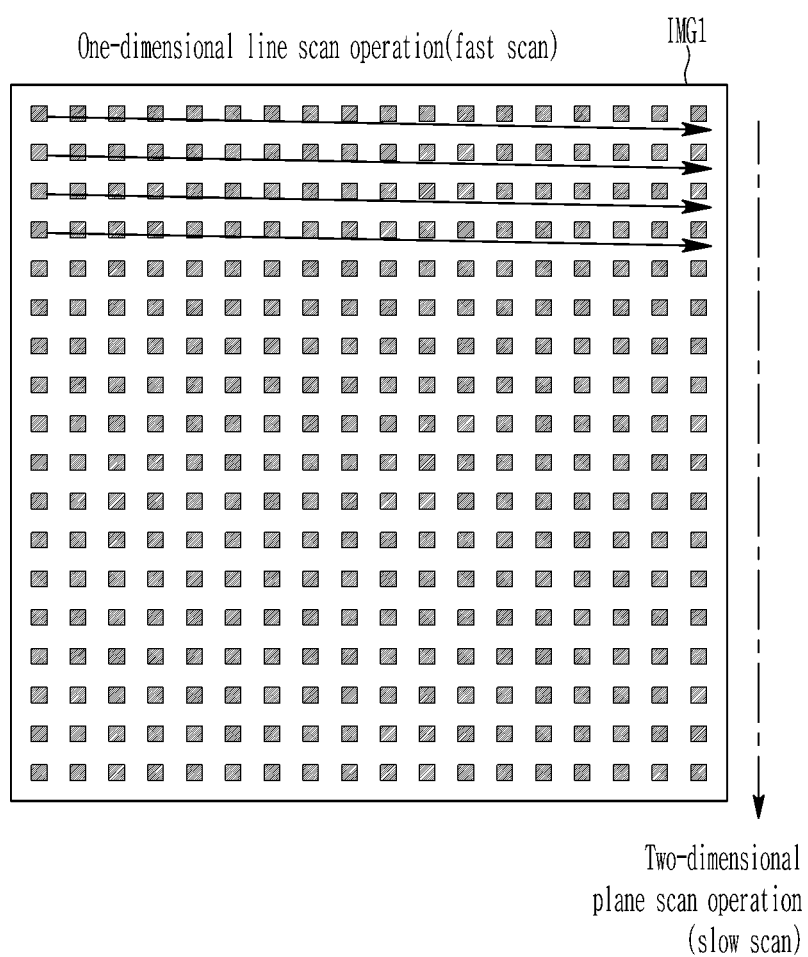

Referring to FIGS. 2, 3, and 5 together, the polygon mirror assembly 1 according to an embodiment of the present disclosure can perform a one-dimensional line scan operation.

After the first motor 20 is coupled to the polygon mirror 10, if the polygon mirror 10 is rotated at a high speed using the first motor 20, electromagnetic waves incident to a center of the polygon mirror 10 may be reflected to as many points (for example, on a two-dimensional scan image IMG1) as the number of reflection surfaces of the polygon mirror 10 each time the polygon mirror 10 rotates. In this manner, the polygon mirror assembly 1 may perform a one-dimensional line scan operation.

The waves reflected from the polygon mirror 10 are focused on a surface of a specimen (or a sample) through, for example, an F-theta lens, then reflected from the specimen, and then pass through the F theta lens again to form a scan image. Based on the one-dimensional line scan operation, the scan may be performed on the two-dimensional scan image IMG1 in a manner that the scan progresses from left to right in each row.

Figure 4:
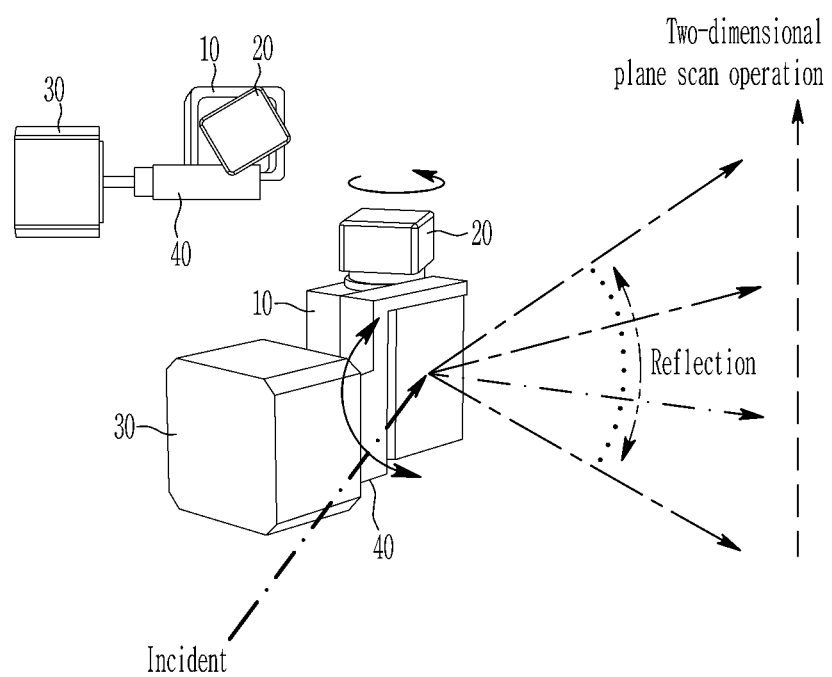

Next, Referring to FIGS. 2, 4, and 5 together, the polygon mirror assembly 1 according to an embodiment of the present disclosure may perform a two-dimensional plane scan operation.

As shown in FIG. 3, when the polygon mirror 10 rotating at a high speed and the first motor 20 coupled to the polygon mirror 10 are simultaneously tilted, positions of points where electromagnetic waves incident to the center of the polygon mirror 10 are incident (for example, on the two-dimensional scan image IMG1) may be moved. In this manner, the polygon mirror assembly 1 may perform the two-dimensional plane scan operation.

In other words, when the rotation axis of the polygon mirror 10 is tilted while repeating the one-dimensional line scan operation that proceeds from left to right in each row in the two-dimensional scan image IMG1, the row on which the one-dimensional scan operation is performed can be changed to another row (for example, a next row) on the two-dimensional scan image IMG1, so that a two-dimensional scan of the specimen can be performed.

In order to repeat the one-dimensional scan operation for each row as described above, the second motor 30 repeatedly moves the polygon mirror 10 such that the rotation axis is tilted only within a predetermined angle range, for example, within a range of 10 degrees to −10 degrees up and down, however the range may vary depending on a specific purpose of implementation.

In this embodiment, for example, the speed of scan operation performed in the horizontal direction (for example, left and right directions) of the two-dimensional scan image IMG1 (i.e., the speed of performing the one-dimensional scan operation in a row) may be faster than the speed of scan operation performed in the vertical direction of the two-dimensional scan image IMG1 (i.e., the speed of changing rows). In other words, the rotation speed of the first motor 20 may be faster than the rotation speed of the second motor 30.

In the present embodiment, the first motor 20 may be a brushless direct current (BLDC) motor and the second motor 30 may be a stepping motor, but the scope of the present disclosure is not limited thereto.

Figure 6:
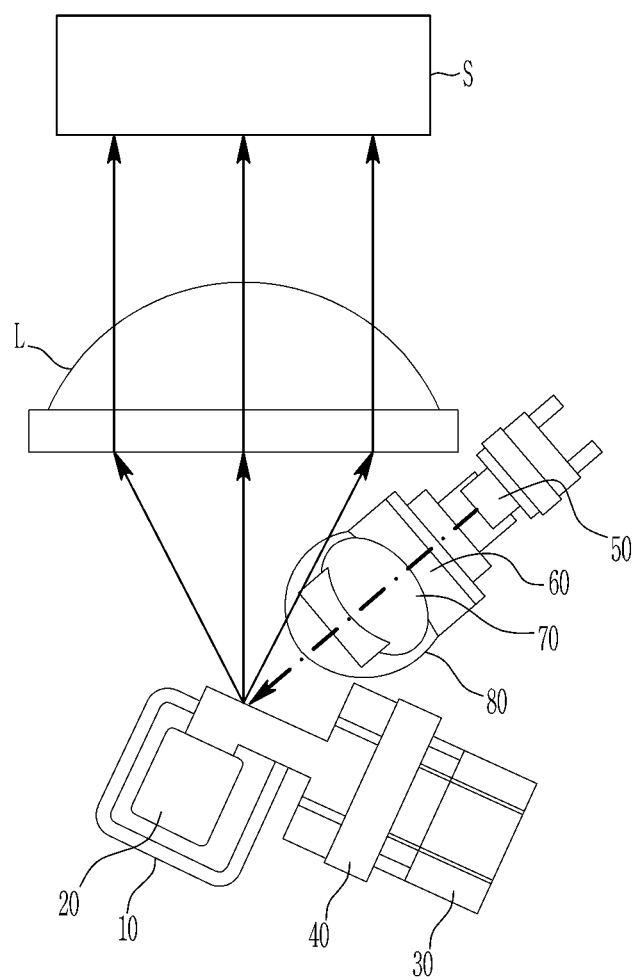
FIGS. 6 and 7 illustrate a scan device according to an embodiment of the present disclosure.
Figure 7:
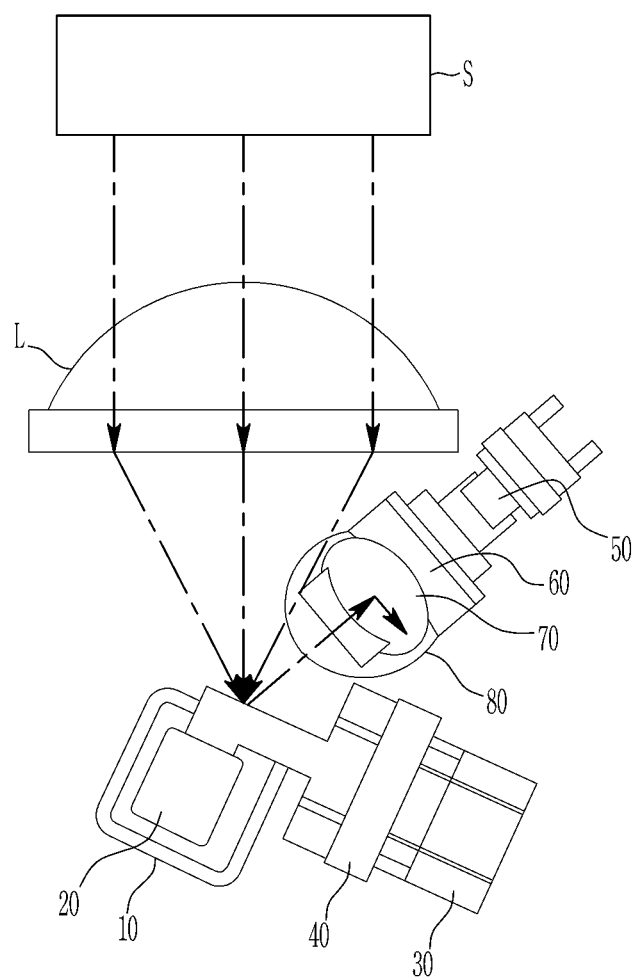

FIGS. 6 and 7 illustrate a scan device according to an embodiment of the present disclosure.

Referring to FIG. 6, a scan device 2 according to an embodiment of the present disclosure may include the polygon mirror assembly 1, which includes the polygon mirror 10, the first motor 20, the second motor 30, and the intermediate connection 40 as described above, a light source 50, a collimating lens 60, a beam splitter 70, a detector 80, and an F theta lens L. However, the configuration of the scan device 2 according to the present embodiment is merely an example, and a person skilled in the art may easily change the configuration of the scan device 2 according to a specific purpose of implementation.

As described above, the polygon mirror assembly 1 may include the polygon mirror 10, and may move the polygon mirror 10 in a first axial direction such that a rotation axis is tilted using the second motor 30, while rotating the polygon mirror 10 around the rotation axis using the first motor 20. Regarding the contents already described above with respect to the polygon mirror assembly 1, redundant descriptions will be omitted.

The light source 50 may be any device capable of generating electromagnetic waves. In particular, the light source 50 may generate electromagnetic waves including millimeter waves or terra waves.

The collimating lens 60 may form electromagnetic waves generated and incident from the light source 50 in parallel.

The beam splitter 70 may transmit electromagnetic waves incident from the light source 50 to the polygon mirror 10 or transmit electromagnetic waves reflected from the polygon mirror 10 (for example, after being generated from the specimen) to the detector 80.

The detector 80 may detect electromagnetic waves reflected from the polygon mirror 10 to obtain a two-dimensional image of a specimen. In detail, the detector 80 may acquire a data value at each two-dimensional coordinate point corresponding to electromagnetic waves reflected from the polygon mirror 10, in other words, a data value representing positions of points where the electromagnetic waves are incident on a two-dimensional scan image.

The F theta lens L may focus electromagnetic waves incident from the polygon mirror 10 on a specimen S, or may focus electromagnetic waves reflected from the specimen S on the polygon mirror 10 again.

In the present embodiment, a parabolic mirror may be further disposed between the beam splitter 70 and the detector 80 to transmit electromagnetic waves reflected from the polygon mirror 10 to the detector 80.

Electromagnetic waves generated from the light source 50 may be formed in parallel through the collimating lens 60 and then pass through the beam splitter 70 to reach the polygon mirror 10. As described above, while being rotated 360 degree by the first motor 20, the polygon mirror 10 may reflect electromagnetic waves to a number of points on the F theta lens L corresponding to the number of reflection surfaces of the polygon mirror 10 each time one rotation is made. In addition, the polygon mirror 10 may repeat moving by the second motor 30 such that the rotation axis is tilted within a predetermined angle range, to move positions of a number of points on the F theta lens L corresponding to the number of reflection surfaces of the polygon mirror 10 determined each time one rotation is made.

In other words, the first motor 20 determines the positions of the points at which electromagnetic waves reflected from the polygon mirror 10 arrive in the horizontal direction (for example, left and right directions) of the F theta lens L surface, and the second motor 30 determines the positions of the points at which electromagnetic waves reflected from the polygon mirror 10 arrive in the vertical direction of the F theta lens L surface.

In this way, electromagnetic waves passing through the points whose positions are two-dimensionally determined on the F theta lens L may be focused on the specimen S in a form of scanning a two-dimensional plane.

Subsequently, referring to FIG. 7, electromagnetic waves reflected from the specimen S may be focused on the polygon mirror 10 through the F theta lens L. These electromagnetic waves can reach the detector 80 after being reflected by the polygon mirror 10 through the beam splitter 70, and also through the parabolic mirror according to a specific purpose of implementation, and the detector 80 can obtain a two-dimensional scan image of the specimen S by obtaining a data value at each two-dimensional coordinate point corresponding to the electromagnetic waves.

For example, setting of the scan device 2 for acquiring a two-dimensional scan image may be as follows. The polygon mirror 10 has four reflection surfaces, and the first motor 20 may rotate the polygon mirror 10 at high speed of 3000 rpm. At the same time, the second motor 30 may perform two-dimensional plane scan by tilting 30 degree for two seconds. The detector 80 may acquire data for two seconds at a sampling rate of 300 k and then generate an image from these data.

In this setting, the number of data measured by the scan device 2 for a total of 2 seconds is 6×105 (3×105 data/s), resulting in a total of 400 row (=3000 rpm/60×4 sides×2 seconds) scans being possible. Accordingly, one row includes 1500 data (=6×105 data/400 lines), and the two-dimensional scan image may be represented by a two-dimensional array image of horizontal×vertical=1500 data× 400 data.

The polygon mirror assembly and the scan device according to the embodiments of the present disclosure described above can be manufactured in a simple structure to obtain a two-dimensional scan image at high speed. Accordingly, the polygon mirror assembly and the scan device can be miniaturized, and thus the mobility of the polygon mirror assembly and the scan device can be increased, while the spatial constraints can be reduced, thereby the usability in the field where non-destructive detection is performed can be increased. Furthermore, it is possible to manufacture the polygon mirror assembly and the scan device at low cost.

Figure 8:
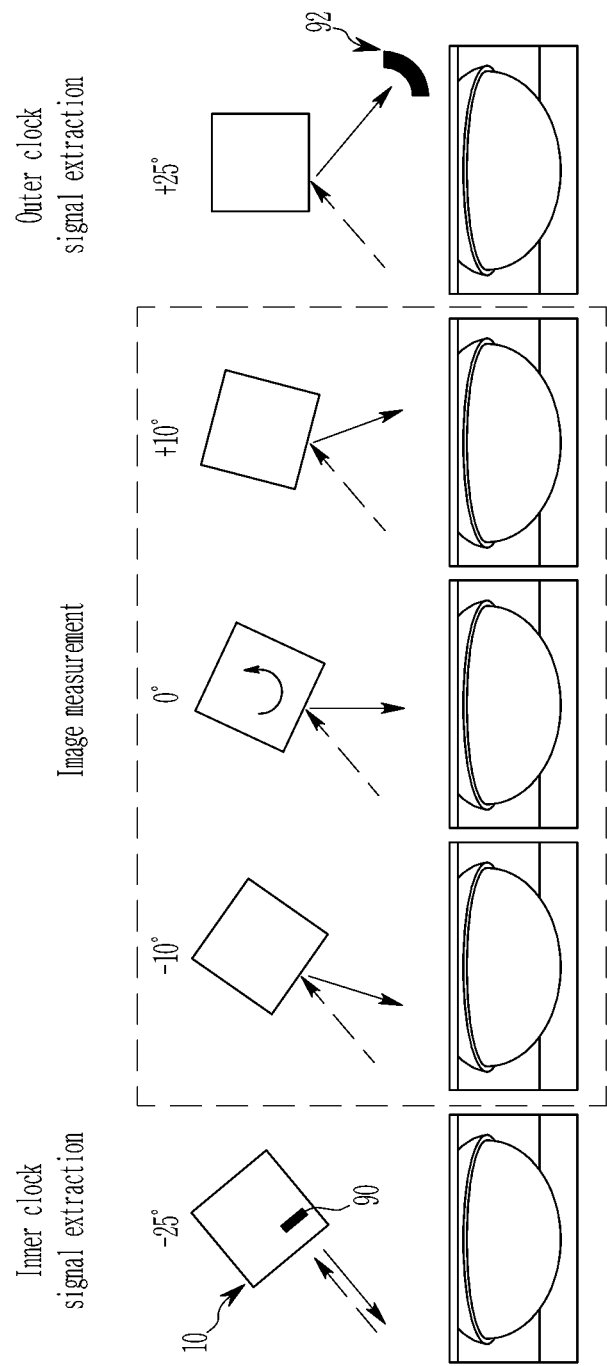
FIG. 8 illustrates operation of a polygon mirror assembly according to another embodiment of the present disclosure.

FIG. 8 illustrates operation of a polygon mirror assembly according to another embodiment of the present disclosure.

Referring to FIG. 8, the polygon mirror assembly according to another embodiment of the present disclosure may further perform an operation for correcting distortion caused by a change in a rotational speed of the first motor 20.

For example, if the first motor 20 that rotates the polygon mirror 10 at high speed does not maintain the rotational speed at a constant speed and shakes by several rpm, as the number of data per row changes, an image distortion may occur, in which the measured two-dimensional image represents a different shape from an actual sample. When the first motor 20 rotates at a constant speed of 3000 rpm, the number of data per row is represented by 1500 data. However, assuming that a change of 3 rpm, which is 0.1% of 3000 rpm, occurs in the rotational speed, a total of 399.6 row (=2997 rpm/60×4 sides×2 seconds) scans are performed, and one row includes 1501.5 data (=6×105 data/399.6 lines), thus the image may be distorted according to the change of the rotational speed rpm for 2 seconds of measuring.

Assuming that the polygon mirror 10 has four reflection surfaces, while one reflection surface is rotated 90 degrees, an angle at which an actual image is measured, that is, an angle reflected toward the F theta lens L, is about 20 degree to about 30 degree, electromagnetic waves reflected from about 60 degrees to about 70 degrees are directed to a direction other than the F theta lens (L) and are not used for image measurement. Of course, such a range is merely an example, and the range may vary depending on the specific structure of the optical system. In order to correct image distortion, the polygon mirror assembly according to the present embodiment may use electromagnetic waves reflected from an angle at which the image is not measured.

Specifically, the polygon mirror assembly may reflect electromagnetic waves incident from the light source 50 in one of the angles (for example, −25 degrees or 25 degrees in FIG. 8) outside the angles at which the image is measured (for example, −10 degrees to 10 degrees in FIG. 8), and the reflected electromagnetic waves may proceed to the detector 80 rather than a specimen. That is, the polygon mirror assembly may reflect electromagnetic waves incident from the light source 50 to the detector 80 at an angle at which the polygon mirror 10 does not scan the specimen, and the detector 80 may correct image distortion using the incident electromagnetics reflected in that angle.

In the specification, electromagnetic waves for detecting a change in a rotational speed of the first motor 20, which are generated from the light source 50 and reflected by the polygon mirror 10 and then incident on the detector 80 without scanning the specimen, are referred to as a "clock signal."

From this, the two-dimensional image of the specimen generated from electromagnetic waves reflected from the polygon mirror 10 includes a plurality of rows, each of the plurality of rows includes the image signal for the specimen and the clock signal together, and the detector 80 may correct distortion due to the change in the rotational speed of the first motor 20 by aligning the plurality of rows based on the clock signal.

Figure 9:
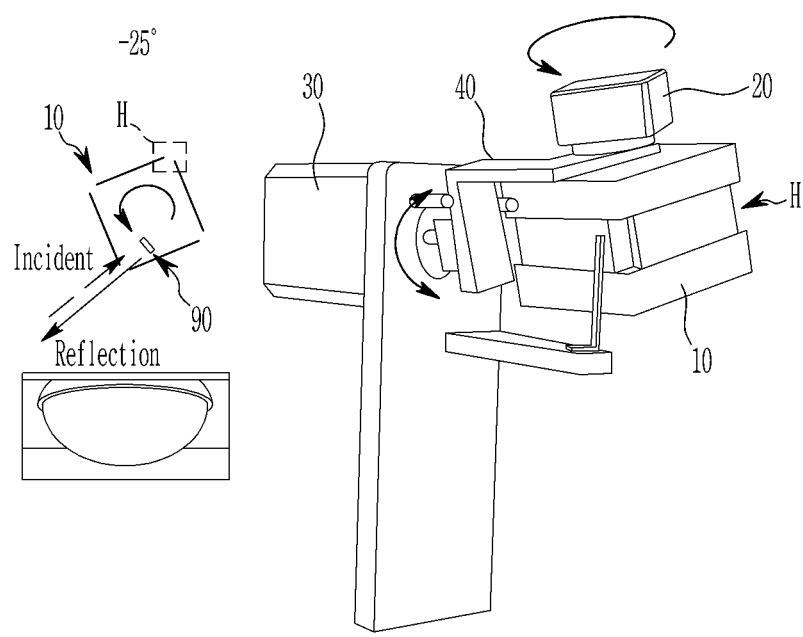
FIG. 9 illustrates a polygon mirror assembly according to another embodiment of the present disclosure.
Figure 10:
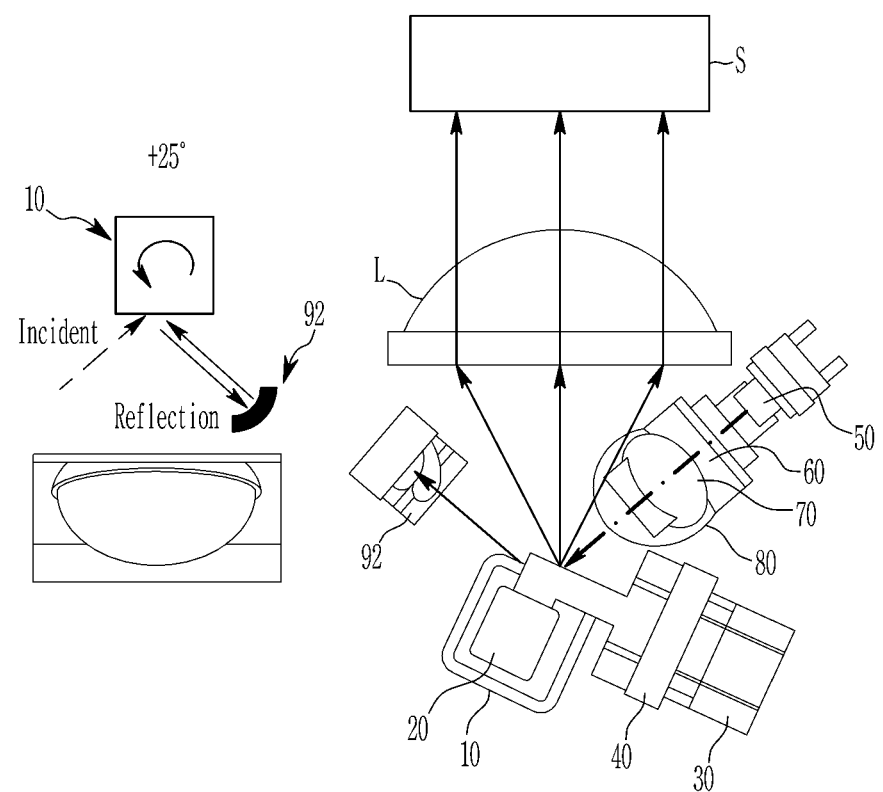
FIGS. 10 and 11 illustrate a polygon mirror assembly according to another embodiment of the present disclosure.
Figure 11:
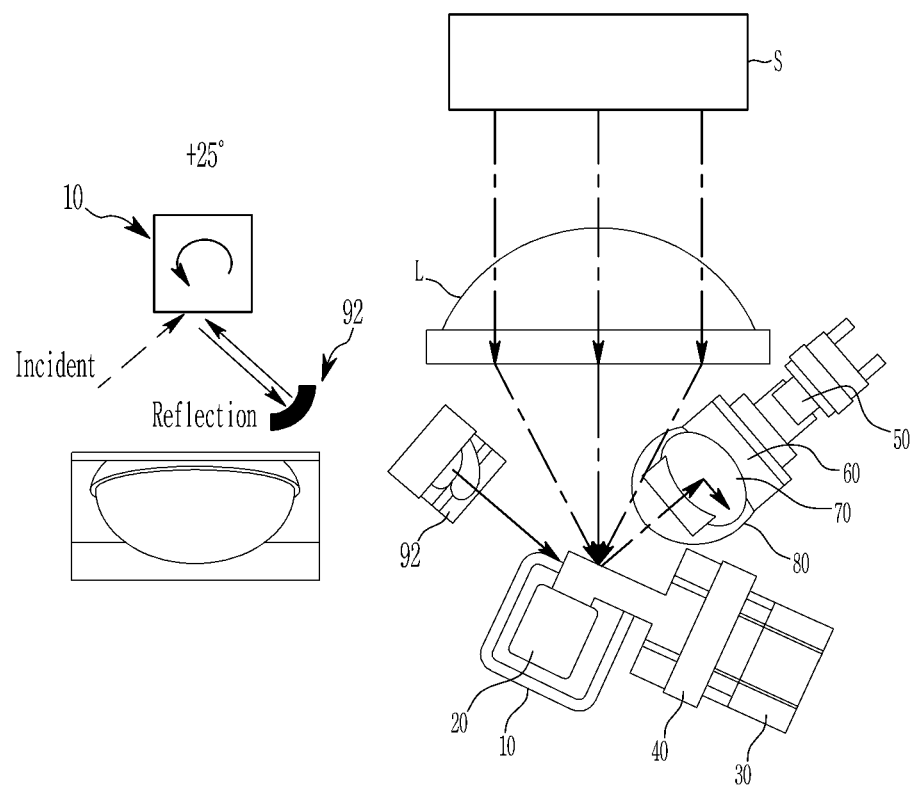

Referring now to FIGS. 9 to 11, an example approach for obtaining a clock signal will be described.

FIG. 9 illustrates a polygon mirror assembly according to another embodiment of the present disclosure.

Referring to FIG. 9, a polygon mirror assembly according to another embodiment of the present disclosure may include a clock signal extraction surface 90 disposed inside the polygon mirror 10. The clock signal extraction surface 90 may reflect electromagnetic waves generated from the light source 50 and incident on the polygon mirror 10.

In order to inject electromagnetic waves into the clock signal extraction surface 90 disposed inside the polygon mirror 10, in the present embodiment, the polygon mirror 10 may include holes H at each corner. The electromagnetic waves incident through the holes H are reflected by the clock signal extraction surface 90 disposed inside the polygon mirror 10 to reach the detector 80 together with electromagnetic waves reflected from the specimen S. The detector 80 may obtain a two-dimensional scan image of the specimen S and correct image distortion by obtaining data values at each two-dimensional coordinate point corresponding to these electromagnetic waves.

FIGS. 10 and 11 illustrate a polygon mirror assembly according to another embodiment of the present disclosure.

Referring to FIGS. 10 and 11, a polygon mirror assembly according to another embodiment of the present disclosure may include a clock signal extraction surface 92 disposed outside the polygon mirror 10. The clock signal extraction surface 92 may reflect electromagnetic waves generated from the light source 50 and incident after reflection on the polygon mirror 10.

As shown in FIG. 10, electromagnetic waves generated from the light source 50 may be formed in parallel through the collimating lens 60, and then may pass through the beam splitter 70 to reach the polygon mirror 10.

At an angle at which an image is measured, as described above, while being rotated 360 degree by the first motor 20, the polygon mirror 10 may reflect electromagnetic waves to a number of points on the F theta lens L corresponding to the number of reflection surfaces of the polygon mirror 10 each time one rotation is made. In addition, the polygon mirror 10 may repeat moving by the second motor 30 such that the rotation axis is tilted within a predetermined angle range, to move positions of a number of points on the F theta lens L corresponding to the number of reflection surfaces of the polygon mirror 10 determined each time one rotation is made. In this way, electromagnetic waves passing through the points whose positions are two-dimensionally determined on the F theta lens L may be focused on the specimen S in a form of scanning a two-dimensional plane.

Meanwhile, at an angle at which the image is not measured, the polygon mirror 10 reflects electromagnetic waves generated from the light source 50 to reach the clock signal extraction surface 92.

Subsequently, referring to FIG. 11, electromagnetic waves reflected from the specimen S may be focused on the polygon mirror 10 through the F theta lens L. In addition, the clock signal reflected from the clock signal extraction surface 92 may be focused on the polygon mirror 10. These electromagnetic waves can reach the detector 80 after being reflected by the polygon mirror 10 through the beam splitter 70, and also through the parabolic mirror according to a specific purpose of implementation, and the detector 80 can obtain a two-dimensional scan image of the specimen S and correct image distortion by obtaining a data value at each two-dimensional coordinate point corresponding to the electromagnetic waves.

Figure 12:
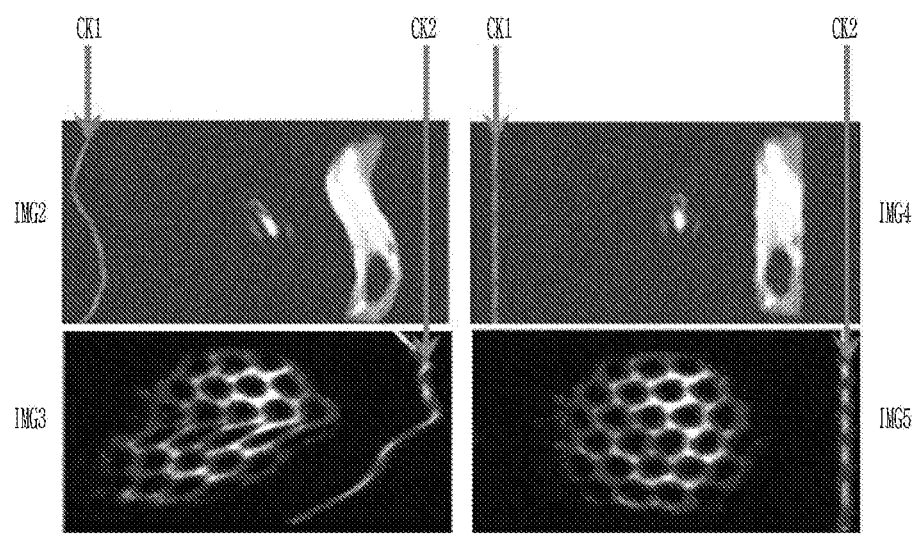
FIG. 12 illustrates a two-dimensional scan image obtained by using a polygon mirror assembly or a scan device of at least one of embodiments of the present disclosure.

FIG. 12 illustrates a two-dimensional scan image obtained by using a polygon mirror assembly or a scan device of at least one of embodiments of the present disclosure.

Referring to FIG. 12, the images IMG2 and IMG3 shown on the left side are distorted images due to the change in the rotational speed of the first motor 20, and the images IMG4 and IMG5 shown on the right side are the results after the polygon mirror assembly or scan device of the present disclosure corrects distortion.

In the case of the image IMG2, for example, the clock signal CK1 extracted in the manner described in FIG. 9 was sampled. In the case of the image IMG3, the clock signal CK2 extracted in the manner described in FIGS. 10 and 11 was sampled. That is, each row of the images IMG2 and IMG3 includes the clock signals CK1 and CK2 together with the image signal for the specimen. The clock signals CK1 and CK2 in the images IMG2 and IMG3 reflect the shaking rpm of the first motor 20 as they are distorted.

The detector 80 may generate a corrected image IMG4 by aligning the plurality of rows based on the clock signal CK1 such that the clock signal CK1 becomes a straight line (for example, in a vertical direction) with respect to the image IMG2. Similarly, the detector 80 may generate a corrected image IMG5 by aligning the plurality of rows based on the clock signal CK2 such that the clock signal CK2 becomes a straight line (for example, in a vertical direction) with respect to the image IMG3.

The polygon mirror assembly and the scan device according to the embodiments of the present disclosure described above can be manufactured in a simple structure to obtain a two-dimensional scan image at high speed. Accordingly, the polygon mirror assembly and the scan device can be miniaturized, and thus the mobility of the polygon mirror assembly and the scan device can be increased, while the spatial constraints can be reduced, thereby the usability in the field where non-destructive detection is performed can be increased. Furthermore, it is possible to manufacture the polygon mirror assembly and the scan device at low cost.

In addition, the reflection surfaces of the polygon mirror can be manufactured in a single structure to minimize the distances from a center of rotation to all the reflection surfaces, thereby increasing a diameter of an incident beam for realizing high resolution, and distortion due to tilting which will be described later can be minimized.

Furthermore, it is possible to correct distortion caused by the inability to keep the rpm of the motor that rotates the polygon mirror at a high speed, thus it is possible to use a low-cost small motor, miniaturize the polygon mirror assembly and the scan device, and manufacture the polygon mirror assembly and the scan device at low cost, thereby the usability in the field where non-destructive detection is performed can be increased.

Although the embodiments of the present disclosure have been described in detail above, the scope of the present disclosure is not limited thereto. Many variations and modifications of a person skilled in the art using the basic concept of the present disclosure defined in the following claims, also fall within the scope of the present disclosure.

What is claimed is:

1. A polygon mirror assembly comprising:
   a polygon mirror including a plurality of reflection surfaces spaced apart from a rotation axis by a predetermined distance;
   a first motor for rotating the polygon mirror around the rotation axis;
   a second motor for moving the polygon mirror in a first axial direction such that the rotation axis is tilted while the first motor rotates the polygon mirror; and
   a clock signal extraction surface for extracting a clock signal for detecting a change in a rotational speed of the first motor.

2. The polygon mirror assembly of claim 1, wherein the second motor repeatedly moves the polygon mirror such that the rotation axis is tilted only within a predetermined angle range.

3. The polygon mirror assembly of claim 1, wherein a shaft of the first motor is disposed on the rotation axis of the polygon mirror.

4. The polygon mirror assembly of claim 1, wherein the second motor is coupled to the polygon mirror via an intermediate connection, and one end of the intermediate connection is coupled to the first motor, while the another end of the intermediate connection is coupled to a shaft of the second motor.

5. The polygon mirror assembly of claim 1, wherein the rotational speed of the first motor is faster than a rotational speed of the second motor.

6. The polygon mirror assembly of claim 1, wherein the clock signal extraction surface reflects electromagnetic waves incident from a light source at an angle at which the polygon mirror does not scan a specimen.

7. The polygon mirror assembly of claim 1, wherein the clock signal extraction surface is disposed inside the polygon mirror, and reflects electromagnetic waves generated from a light source and is incident on the polygon mirror.

8. The polygon mirror assembly of claim 1, wherein the clock signal extraction surface is disposed outside the polygon mirror, and reflects electromagnetic waves incident after reflection on the polygon mirror.

9. The polygon mirror assembly of claim 1, wherein the polygon mirror includes acrylonitrile butadiene styrene copolymer (ABS) resin, and the plurality of reflection surfaces are chrome plated.

10. A polygon mirror assembly comprising:
    a polygon mirror including a plurality of reflection surfaces spaced apart from a rotation axis by a predetermined distance;
    a first motor rotating the polygon mirror around the rotation axis;
    a second motor for moving the polygon mirror in a first axial direction such that the rotation axis is tilted; and
    an intermediate connection at which one end is coupled to the first motor and the another end is coupled to a shaft of the second motor.

11. The polygon mirror assembly of claim 10, wherein a shaft of the first motor is disposed on the rotation axis of the polygon mirror.

12. The polygon mirror assembly of claim 10, wherein the second motor repeatedly moves the polygon mirror such that the rotation axis is tilted only within a predetermined angle range.

13. The polygon mirror assembly of claim 10, wherein the polygon mirror includes a clock signal extraction surface that reflects electromagnetic waves incident on the polygon mirror at an angle at which the polygon mirror does not scan a specimen.

14. The polygon mirror assembly of claim 10, wherein the first motor is a brushless direct current (BLDC) motor, and the second motor is a stepping motor.

15. A scan device comprising:
    a light source for generating electromagnetic waves including millimeter waves or terra waves;
    a collimating lens for forming the electromagnetic waves generated from the light source in parallel;
    a polygon mirror assembly including a polygon mirror, the polygon mirror assembly moving the polygon mirror in a first axial direction such that a rotation axis is tilted using a second motor, while rotating the polygon mirror around the rotation axis using a first motor;
    a detector for detecting electromagnetic waves reflected from the polygon mirror and obtaining a two-dimensional image of a specimen; and
    a clock signal extraction surface for extracting a clock signal for detecting a change in a rotational speed of the first motor.

16. The scan device of claim 15, wherein the second motor repeatedly moves the polygon mirror such that the rotation axis is tilted only within a predetermined angle range.

17. The scan device of claim 15, wherein the clock signal extraction surface reflects electromagnetic waves incident from a light source at an angle at which the polygon mirror does not scan the specimen.

18. The scan device of claim 15, wherein the clock signal extraction surface is disposed inside the polygon mirror, and reflects electromagnetic waves generated from the light source and incident on the polygon mirror.

19. The scan device of claim 15, wherein the clock signal extraction surface is disposed outside the polygon mirror, and reflects electromagnetic waves incident after reflection on the polygon mirror.

20. The scan device of claim 15, wherein the two-dimensional image of the specimen includes a plurality of rows, each of the plurality of rows including an image signal for the specimen and the clock signal, and the detector corrects distortion of the two-dimensional image due to the change in the rotational speed of the first motor by aligning the plurality of rows based on the clock signal.

* * * * *